C. W. Le Count,
Lathe Dog,
N° 50,604.   Patented Oct. 24, 1865.
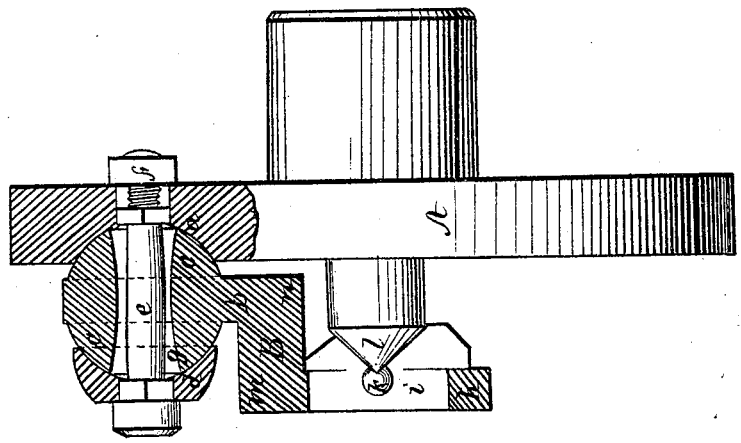
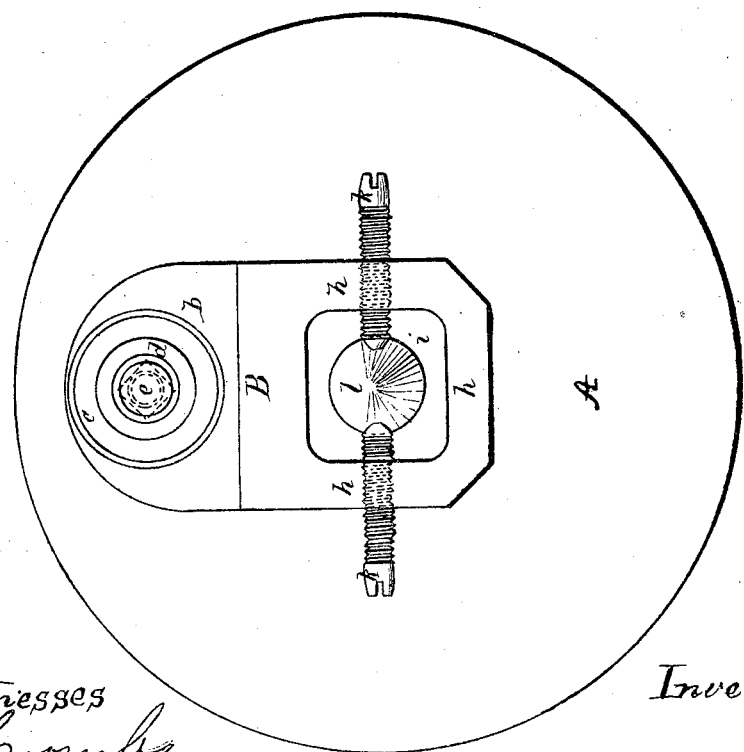
Witnesses
J W Coombs
G W Reed
Inventor.
C. W. Le Count

UNITED STATES PATENT OFFICE.

C. W. LE COUNT, OF NORWALK, CONNECTICUT.

LATHE-DOG.

Specification forming part of Letters Patent No. 50,604, dated October 24, 1865.

*To all whom it may concern:*

Be it known that I, C. W. LE COUNT, of Norwalk, in the county of Fairfield and State of Connecticut, have invented a new and useful Improvement in Lathe Dogs or Carriers; and I do hereby declare the following to be a full, clear, and exact description of the same, reference being had to the accompanying drawings, forming a part of this specification, in which—

Figure 1 is a face view of a chuck and a dog or carrier attached thereto according to my invention. Fig. 2 is a side view of the same, with the dog in section.

Similar letters of reference indicate corresponding parts in both figures of the drawings.

This invention relates to dogs or carriers which are attached to the center-chucks of lathes. Heretofore the dogs for turning work between centers have been most commonly attached only to the work, and have been driven by entering a slot in the face-plate. It is more convenient to have them permanently attached to the center-chucks; but hitherto in cases where the dogs have been attached to the center-chuck the attachment has been rigid, and could only be used when the two centers were in line with each other, and not when the centers were arranged out of line, as is the common practice in turning taper-work.

The object of my invention is to adapt a dog attached permanently to the center-chuck to the turning of all kinds of work; and to this end it consists in the attachment of the dog to the center-chuck by means of a ball-and-socket joint or its equivalent, whereby the necessary play is permitted; and it further consists in a novel construction of the chuck itself, whereby it is better adapted to work of taper form and of different transverse sectional forms.

To enable others skilled in the art to make and use my invention, I will proceed to describe its construction and operation.

A is the center-chuck, in which the live center $l$ is secured, and at a suitable distance from the center of which there is in its face a concave seat, $a$, which forms part of the ball-and-socket joint by which the dog or carrier B is permanently attached to the chuck. This dog is made with two elbows, $m$ and $n$, Fig. 2, by which the arm $b$, on which is formed the ball $c$ of the ball-and-socket joint, is connected rigidly with the frame or open part $h$, which receives the work.

The frame or open part $h$ of the dog, the elbows $m$ $n$, the arm $b$, and the ball $c$ are made in one piece. The frame $h$ is made with a round-cornered square opening, $i$, for the reception of the work, and in opposite sides of it are tapped holes for the reception of two screws, $k$ $k$, which are arranged in line with each other, and which are screwed inward upon the work to attach the dog firmly thereto.

The other part of the ball-and-socket joint which attaches the dog to the center-chuck consists of a cap, $d$, fitted to the ball $c$ opposite the seat $a$ in the chuck, and attached to the chuck by a bolt, $d$, passing centrally through the said cap, the ball, the seat $a$, and the flange of the chuck A, and secured to the latter by a nut, $f$. The central hole, $g$, provided in the ball $c$ for the passage of the bolt $e$, is made large enough and larger toward the back and front to allow a free movement of the ball to a considerable extent in the socket $a$ $d$. The elbows of the carrier bring the frame $h$ of the dog far enough out from the face of the chuck and beyond the live center $l$ to permit the screws $k$ $k$ to attach it firmly to the work at a suitable distance from the end thereof. The arrangement of the two screws allows the dog to be adapted to and firmly secured to work of eccentric or other irregular or taper form; and the ball-and-socket attachment, while it keeps the dog always in place for use, allows the dog sufficient play relatively to the chuck to accommodate any deviation of the live and dead centers of the lathe from a right line.

Although I prefer the ball-and-socket attachment of the dog to the center-chuck, it is not absolutely essential, as any other attachment that will allow the same free play to the dog relatively to the chuck will serve the same purpose.

What I claim as my invention, and desire to secure by Letters Patent, is—

1. The attachment of a dog or carrier to the center-chuck of a lathe by means of a ball-and-socket joint or its equivalent, substantially as and for the purpose herein specified.

2. Furnishing the so-attached dog with two set-screws, $k$ $k$, arranged on opposite sides and in line with each other, substantially as and for the purpose herein specified.

C. W. LE COUNT.

Witnesses:
HENRY T. BROWN,
J. W. COOMBS.